US008010692B1

(12) United States Patent
Shanson et al.

(10) Patent No.: US 8,010,692 B1
(45) Date of Patent: Aug. 30, 2011

(54) ADAPTING AUDIO AND VIDEO CONTENT FOR HARDWARE PLATFORM

(75) Inventors: Spencer Shanson, Menlo Park, CA (US); Anjali Bhardwaj, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 13 days.

(21) Appl. No.: 12/612,805

(22) Filed: Nov. 5, 2009

(51) Int. Cl.
G06F 15/16 (2006.01)
G06F 15/173 (2006.01)
G06F 15/177 (2006.01)

(52) U.S. Cl. .............. 709/231; 375/240.01; 375/240.12

(58) Field of Classification Search .................. 709/231; 375/240.01, 240.12
See application file for complete search history.

(56) References Cited

U.S. PATENT DOCUMENTS

| | | | | |
|---|---|---|---|---|
| 7,702,805 | B1* | 4/2010 | Kapoor | 709/231 |
| 7,761,602 | B1* | 7/2010 | Knight et al. | 709/246 |
| 2007/0133692 | A1* | 6/2007 | Reddy et al. | 375/240.25 |
| 2008/0044089 | A1* | 2/2008 | Alasia et al. | 382/232 |
| 2008/0232460 | A1* | 9/2008 | Sadowksi et al. | 375/240.01 |
| 2008/0232704 | A1* | 9/2008 | Sadowski et al. | 382/233 |
| 2009/0003447 | A1* | 1/2009 | Christoffersen et al. | 375/240.16 |
| 2009/0290063 | A1* | 11/2009 | Xie | 348/448 |
| 2010/0054622 | A1* | 3/2010 | Adams | 382/269 |
| 2010/0128778 | A1* | 5/2010 | Ji et al. | 375/240.2 |
| 2010/0166068 | A1* | 7/2010 | Perlman et al. | 375/240.12 |
| 2010/0250764 | A1* | 9/2010 | Vare et al. | 709/231 |
| 2010/0299448 | A1* | 11/2010 | Cuoq | 709/234 |

* cited by examiner

Primary Examiner — Haresh N Patel
(74) Attorney, Agent, or Firm — Fish & Richardson P.C.

(57) ABSTRACT

A single stream synchronously forwarded from an application runtime engine and comprising at least first and second types of data is received, the single stream having a format associated with the runtime engine. A first type data stream and a second type data stream are generated from the single stream. Converted data streams are generated from the first and second type data streams by changing the format to a standard-compliant format according to a standard with which at least one hardware decoder in the electronic device complies. The method includes determining that the hardware decoder is available to decode the converted data streams. Upon the determination, the converted data streams are forwarded to the hardware decoder. The method includes generating, by the hardware decoder, at least one decoded data stream from the modified data streams. The method includes generating an output from the decoded data stream.

19 Claims, 4 Drawing Sheets

ADAPTING AUDIO AND VIDEO CONTENT FOR HARDWARE PLATFORM

BACKGROUND

This specification relates to adapting application output, such as from an Adobe® Flash® multimedia platform or another multimedia platform, to make the application compatible with one or more hardware platforms. As an example, the Flash® multimedia platform can be used to generate animation, advertisements, various web page Flash® components, Internet applications, and other content. The content can be displayed on a consumer electronic device including, but not limited to a television, a mobile telephone, a personal digital assistant (PDA), a mobile audio or video player, a game console, a Global Positioning System (GPS) receiver, a blu-ray player, a set-top box, an appliance, or other internet connectable digital devices.

SUMMARY

This specification describes technologies related to adapting application output.

In a first aspect, a computer-implemented method includes receiving, in an electronic device, a single stream that is synchronously forwarded from a runtime engine of an application and that comprises at least first and second types of data, the single stream having a format associated with the runtime engine. The method includes generating a first type data stream and a second type data stream from the single stream. The method includes generating converted data streams from the first and second type data streams by changing the format to a standard-compliant format according to a standard with which at least one hardware decoder in the electronic device complies. The method includes determining that the hardware decoder is available to decode the converted data streams. The method includes upon the determination, forwarding the converted data streams to the hardware decoder. The method includes generating, by the hardware decoder, at least one decoded data stream from the modified data streams. The method includes generating an output from the decoded data stream.

Implementations can include any or all of the following features. Each of the first and second types of data can include at least one data type selected from: video, audio, image, text, and closed-captioning information. The first and second data types can include audio and video data types, respectively, and the method can further include identifying the audio and video data types; and determining whether the hardware decoder is capable of decoding the audio and video data types. For particular audio and video data types the determination can be made that the hardware decoder is not capable of decoding at least one of the particular audio and video data types, and the method can further include forwarding other converted data streams based on data having the particular audio and video data types to a software decoder in the electronic device; generating, by the software decoder, at least another decoded data stream from the other converted data streams; and generating another output from the other decoded data stream. Determining that the hardware decoder is available can include receiving a first notification from the hardware decoder indicating at least one of a buffer-low event and a buffer-empty event in the hardware decoder. A second notification can be received from the hardware decoder before the first notification, the second notification indicating a buffer-full event in the hardware decoder, and the method can further include delaying the forwarding of the converted data streams until the first notification is received. The electronic device can include an adapter layer communicating with the runtime engine and with a platform layer that includes the hardware decoder, wherein the adapter layer includes a video first-in-first-out (FIFO) queue and an audio FIFO queue, and wherein upon the adapter layer receiving a packet of the data from the runtime engine, and the method can further include forwarding the packet to an applicable FIFO queue of the video and audio FIFO queues; returning control back to the runtime engine after forwarding the packet; and upon the hardware decoder requesting first additional data, requesting at least one of the video and audio FIFO queues to feed the first additional data to the hardware decoder. The method can further include determining that the hardware decoder is requesting second additional data; determining that an applicable FIFO queue for the second additional data is empty; determining that the runtime engine is offering the second additional data; and forwarding the second additional data from the runtime engine to the hardware decoder without placing the second additional data in the applicable FIFO queue. The format can include that the single stream comprises packets each having a header, wherein the runtime engine distinguishes between audio information packets and video information packets using the headers, and wherein generating the converted data streams can include removing the headers from the audio information packets and the video information packets; and reformatting the data, after removing the headers, to change the format to the standard-compliant format.

For a particular converted data stream the determination can be made that the hardware decoder is not available to decode the particular modified data stream, and the method can further include forwarding a notification to the runtime engine to reduce the synchronous forwarding of the data, wherein the runtime engine reduces the synchronous forwarding of the data in response to the notification. The runtime engine can forward data at a predefined rate, and the notification to reduce the synchronous forwarding can cause the runtime engine to re-forward a data portion that the runtime engine forwarded before the notification.

In a second aspect, a computer program product is tangibly embodied in a tangible program carrier and includes instructions that when executed by a processor perform a method including receiving, in an electronic device, a single stream that is synchronously forwarded from a runtime engine of an application and that comprises at least first and second types of data, the single stream having a format associated with the runtime engine. The method includes generating a first type data stream and a second type data stream from the single stream. The method includes generating converted data streams from the first and second type data streams by changing the format to a standard-compliant format according to a standard with which at least one hardware decoder in the electronic device complies. The method includes determining that the hardware decoder is available to decode the converted data streams. The method includes, upon the determination, forwarding the converted data streams to the hardware decoder. The method includes generating, by the hardware decoder, at least one decoded data stream from the modified data streams. The method includes generating an output from the decoded data stream.

In a third aspect, an electronic device includes a processor, and a hardware decoder configured to generate decoded data compliant with a standard-compliant format according to a standard, and forward the decoded data for output. The device includes a computer readable storage medium including instructions that when executed by the processor generate:

(A) a runtime engine of an application, the runtime engine synchronously forwarding a single stream that comprises at least first and second types of data, the single stream having a format associated with the runtime engine; (B) a first player module that (B1) receives the single stream, (B2) determines that the hardware decoder is available, and (B3) generates a first type data stream and a second type data stream from the single stream; and (C) a second player module that (C1) receives the first and second type data streams from the first player module, (C2) generates converted data streams from the first and second type data streams by changing the format to the standard-compliant format, and (C3) forwards the converted data streams to the hardware decoder.

Implementations can include any or all of the following features. The instructions when executed by the processor can further generate: (D) an adapter that (D1) receives the single stream from the runtime engine and forwards the single stream to the first player module, (D2) identifies the first and second types of data, and (D3) determines whether the hardware decoder is capable of decoding the first and second types of data. For particular audio and video data types the adapter can determine that the hardware decoder is not capable of decoding at least one of the particular audio and video data types, and wherein the instructions when executed by the processor further generate: (E) a software decoder; wherein the adapter further (D4) forwards other modified data streams based on data having the particular audio and video data types to the software decoder; wherein the software decoder (E1) generates at least another decoded data stream from the other modified data streams; and wherein another output is generated from the other decoded data stream. The adapter can be included in an adapter layer that includes a video first-in-first-out (FIFO) queue and an audio FIFO queue, and wherein upon the adapter layer receiving a packet of the data from the runtime engine, the adapter (D4) forwards the packet to an applicable FIFO queue of the video and audio FIFO queues, (D5) returns control back to the runtime engine after forwarding the packet, and, upon the hardware decoder requesting first additional data, (D6) requests at least one of the video and audio FIFO queues to feed the first additional data to the hardware decoder. The adapter can further (D7) determine that the hardware decoder is requesting second additional data, (D8) determine that an applicable FIFO queue for the second additional data is empty, (D9) determine that the runtime engine is offering the second additional data, (D10) forward the second additional data from the runtime engine to the hardware decoder without placing the second additional data in the applicable FIFO queue. The hardware decoder can include at least one buffer for the converted data streams, wherein the hardware decoder further generates a first notification to the first player module indicating at least one of a buffer-low event and a buffer-empty event in the hardware decoder, and wherein the first player module performs the determination that the hardware decoder is available based on the first notification. The hardware decoder can further generate a second notification to the first player module from the buffer before the first notification, the second notification indicating a buffer-full event in the hardware decoder, and wherein the first player module delays the forwarding of the converted data streams until the first notification is received.

Particular embodiments of the subject matter described in this specification can be implemented to realize one or more of the following advantages. An application outputting video and audio can be made compatible with one or more hardware platforms. Flexibility in delivering audiovisual content can be improved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
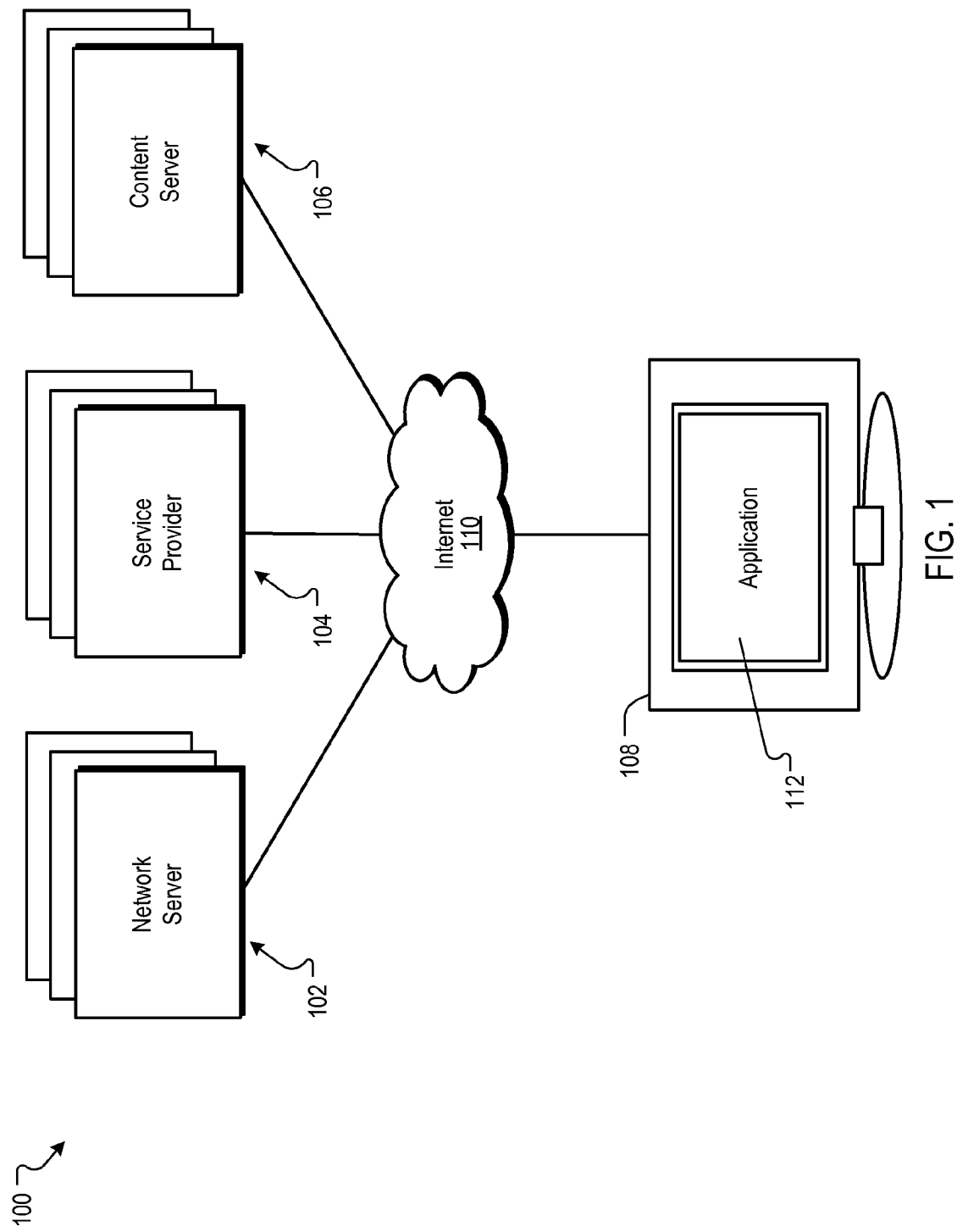
FIG. 1 is a block diagram of an example environment for presenting an audiovisual output stream.

FIG. 1 is a block diagram of an example environment 100 for presenting an audiovisual output stream. In general, the environment 100 can facilitate serving of audio and video information (e.g., media content) from one or more applications to an electronic device. Media content can, for example, include web services, web pages, images, advertisements, audio, video, and/or other interactive data. The media content may be accessed over the Internet, and/or another network. For example, the media content can be forwarded from an application to the electronic device where data formatting, decoding, rendering, or other data operations are performed using the content. For example, media content may be retrieved in one format and decoded into another format for display on a particular electronic device.

The environment 100 can be used to supply content to electronic devices targeted toward multimedia enjoyment. The electronic devices may include one or more of a television, a mobile telephone, a personal digital assistant (PDA), a mobile audio or video player, a game console, a Global Positioning System (GPS) receiver, a blu-ray player, a set-top box, an appliance, or other internet connectable digital device, to name just a few examples. In some implementations, the environment 100 provides hosted services to a consumer via an electronic device.

As shown in FIG. 1, the environment 100 here includes one or more network servers 102, one or more service providers 104, and one or more content servers 106 that are connectively coupled for communication with one or more electronic devices 108 over an Internet network 110. The electronic device 108 shown in this example is an Internet connected digital television capable of streaming media content. The electronic device 108 includes an image display 112 and/or audio output for displaying media content. Although a television is depicted in FIG. 1, the electronic device 108 may represent any device capable of receiving information from network servers 102, service providers 104, and/or content servers 106 via Internet network 110.

The electronic device 108 may include general computing components and/or embedded systems with specific components for performing specific tasks. The electronic device 108 may also include various other elements, such as components for running processes on various machines. Each electronic device includes at least one or more processors, an output device configured to generate audiovisual output, a hardware decoder configured to generate decoded data compliant with a standard format, and memory. Although only one electronic device is depicted, the environment 100 may provide media content via Internet network 110 to any number of electronic devices.

In general, the electronic device 108 can deploy one or more software applications that can be executed to generate media content. For example, the electronic device 108 may include a media player application that can stream online content from a service provider 104. The service provider 104 can provide media content in a particular format for rendering in the electronic device 108. The media player application can utilize both software and hardware resources to stream and present media content in electronic device 108. For example, the media player application can access software resources to format the data stream and can access hardware resources on an electronic device (e.g., television) to decode the data stream. Specifically, the software can perform operations on media content, pass the content to the electronic device hardware, and the electronic device hardware can decode the media content for display without returning the content to the software or other application for further processing. In effect, the environment 100 can present media content by enabling platform-specific implementations for hardware decoding of audio data and video data. In an example, a mobile device can stream media content by utilizing hardware resources on the mobile device to decode the media content, thus freeing up software resources that may require large amounts of memory or more resources on the mobile device than are available to the software.

The network servers 102 represent a user's local networked resources. For example, the network servers 102 may provide access to a TIVO device, a set-top box, a print server, a local area network (LAN), a wide area network (WAN), a personal area network (PAN), and/or other accessible content repository connected to electronic device 108 via Internet 110. The network servers 102 can provide media content to both online users as well as television users over network 110.

The service providers 104 provide online services to users. For example, service providers 104 can use the environment 100 to provide subscribed access to online television content (e.g., Hulu, network television video, pay per view, etc.), movies, music, sound bytes, ring tones, images, and other media. In some implementations, service providers 104 can provide open access to any media service downloadable from the Internet 110, for example.

The content servers 106 provide media content to electronic devices. The content servers 106 can obtain the content from one or more media providers and provide the content through an interactive medium, such as the Internet 110. The content may include drivers, modules, advertisements, libraries, services, signals, media player codecs, movies, television shows, and/or other content including such content that combines one or more of the above content items. Content can include embedded information, such as embedded media, videos, links, meta-information, and/or machine executable instructions. Content could also be communicated through RSS (Really Simple Syndication) feeds, radio channels, television channels, print media, websites, or other media.

The network 110 may include a local area network LAN, a WAN, the Internet, or a combination thereof, connecting network servers 102, service providers 104, content servers 106, and electronic devices 108. In some implementations, the various components—such as systems 102-108—may communicate via a virtual private network (VPN), Secure Shell (SSH) tunnel, or other secure network connection. Further, the environment 100 may store some data at a relatively central location (e.g., accessible over a WAN), while concurrently maintaining local data at a user's site for redundancy and to allow processing during downtime.

The environment 100 may include any element or system that facilitates communications among and between various servers and electronic devices. The environment 100 may be networked and include one or more telecommunications networks, such as computer networks, telephone, or other communications networks, the Internet, etc. In some implementations, the environment 100 may facilitate data exchange by way of packet switching using the Internet Protocol (IP). In addition, the architecture 100 may facilitate wired and/or wireless connectivity and communication.

Figure 2:
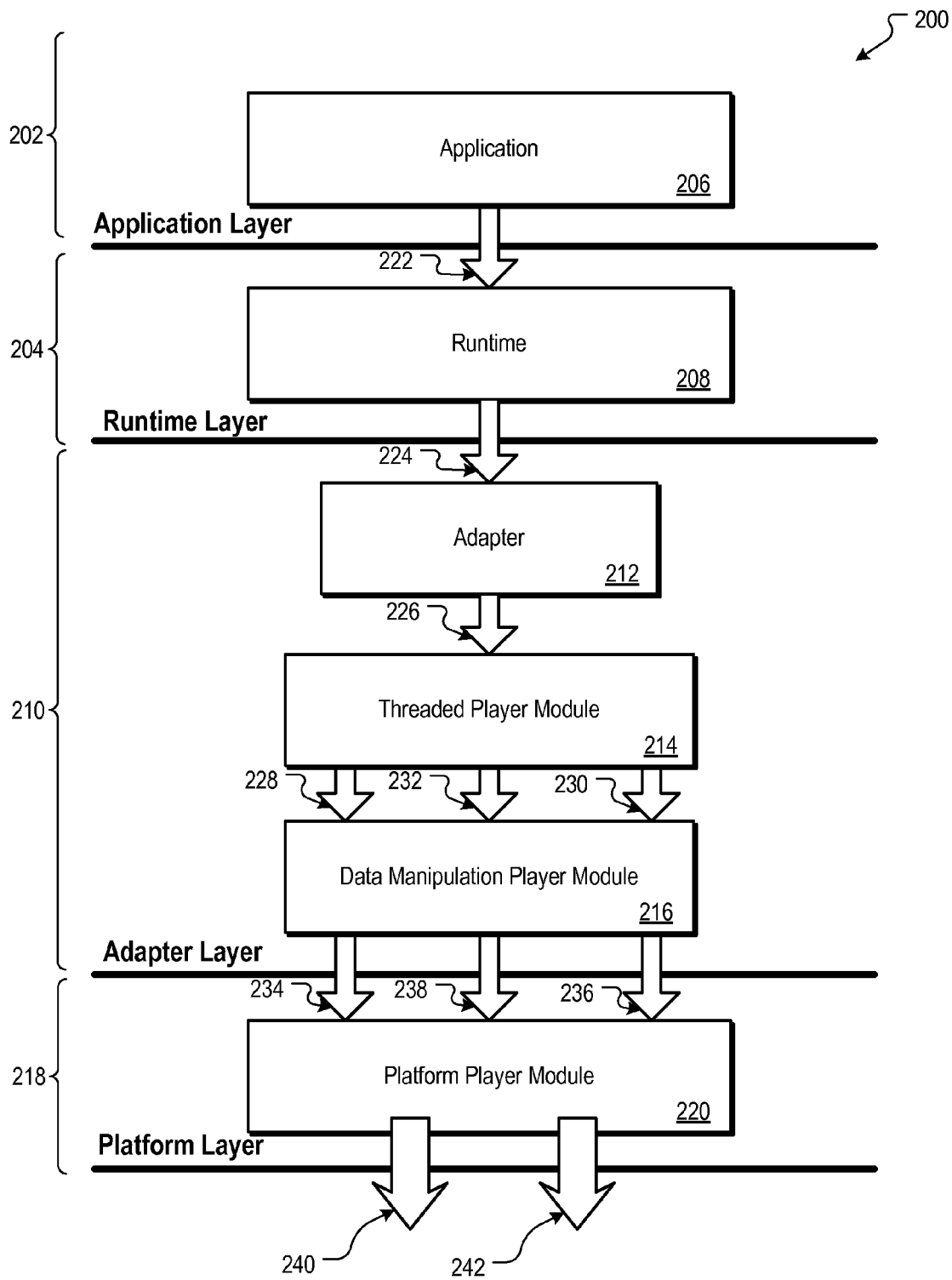
FIG. 2 is a block diagram of an example software architecture for decoding and generating audiovisual output.

FIG. 2 is a block diagram of an example architecture 200 for decoding one or more data types, such as audio and/or video, and generating corresponding output, such as an audiovisual presentation. Below will be described examples of data streams being separated into multiple streams, and data types being converted to standard-compliant formats.

Audiovisual information can be transmitted and presented in a standardized form. Such audiovisual output can be interpreted using a combination of both hardware and software components. Certain hardware and software components, however, may not be configured to interpret every format of video and audio content. Here, the architecture 200 can receive non-standardized audiovisual data and modify the data into a standardized form.

For example, the electronic device 108 (FIG. 1) may receive data in a first video format, convert the data into a standard video format, and present the converted data as a renderable output stream in the electronic device. Accordingly, the electronic device includes a hardware decoder configured to generate decoded data compliant with a standard-compliant format according to an industry standard, such as an ISO (International Organization for Standardization) audio or video standard. In some implementations, the architecture 200 can employ signal standardization techniques and other techniques to prevent and/or correct audiovisual data errors (e.g., dropped packets, buffer starvation, etc.) or data formatting errors on an electronic device.

At a high level, the software architecture 200 enables platform-specific implementations of data decoders that use hardware resources to decode incoming data streams. In some implementations, the architecture 200 can decode audio and video data streams and execute audiovisual content for a variety of underlying hardware platforms. For example, the architecture 200 can decode and execute data streams in a substantially similar manner, without any changes, also if an initial hardware platform is modified, upgraded, or swapped for another hardware platform. That is, the architecture 200 can continue to provide the decoding and executing without manual software modifications, such as programming updates. Audio and video data are mentioned herein as examples of data types that can be processed. Other data types may include image, text, and closed-captioning, just to name a few examples.

In this example, the architecture 200 is illustrated as including an implementation of a multimedia platform, as one example an Adobe® Flash® program available from Adobe Systems Incorporated. The architecture 200 here includes, among other layers, an application layer 202, and a runtime layer 204. The application layer 202 includes an application 206 running within the architecture 200. The application layer 202 can, for example, determine which audiovisual stream is played and the origin of the audiovisual stream.

The application layer 202 can also determine which retrieval method to use when streaming the audiovisual data.

For example, the application layer 202 can determine to use a file read function, an HTTP request, an RTMP protocol function, or other communication function. As another example, the application layer 202 can determine which operation(s) to perform on the audiovisual stream. For example, the application layer 202 can determine which operations should be possible to perform and when to perform the operations. Example operations may include, but are not limited to, a play operation, a pause operation, selecting a video size, or selecting a screen position, just to name a few examples. The application layer 202 can also determine which actions invoke the performance of one of the above operations. Example actions may include a user pressing on a remote control, a local user pressing on the hardware device, or an automatic response to other inputs into the application 206.

The runtime layer 204 here includes a runtime 208 which represents the implementation of a multimedia program. In one implementation, the architecture 200 can include a layer corresponding to a Flash® program that is to be implemented on a particular hardware platform. The runtime layer 204 can, for example, operate on instructions received from the application layer 202. For example, the runtime layer 204 can receive instructions from the application layer 202 and translate the instructions into audio and video output. In particular, the runtime 208 can read a stream from a stream source, determine audio and video codec types, and de-multiplex the audio and video within the audiovisual data. In some implementations, the runtime 208 can send audio and video streams to an external decoder for further processing, for example.

The runtime 208 may include one or more native video decoder functions. The functions typically represent software that the runtime layer 204 uses to assess incoming data. Example functions may include retrieving a number of video tracks, verifying that a particular codec is available, retrieving frame size, retrieving audio details, determining frame rates, determining boundaries between files, retrieving timestamps, etc.

In general, the runtime 208 receives a data stream in a specific format. For example, the data stream may include packets of audio and video information in a Flash® format. Each packet includes a pre-pended header that contains metadata. The metadata may indicate whether the data is audio or video. The metadata may also specify the format of the data, frame index information, compensation time, and/or frame type. In some implementations, metadata may include information about packet type. For example, for AAC audio, the metadata may specify that one or more packets include an audio specific configuration notation (e.g., defined by ISO 14496-3) or the metadata can contain other payload information (e.g., defined by ISO 14496-3). Other data may also be included in metadata header information.

In some implementations, the runtime 208 can function as a runtime engine for the application 206. For example, the runtime 208 can synchronously forward a single stream of data to the adapter layer 210. The single stream can have a format associated with the runtime engine (e.g., the runtime 208 can have a proprietary format associated with Adobe® Flash® products).

The architecture 200 here includes an adapter layer 210. The adapter layer 210 operates to convert specific commands, data structures, and events received from the runtime layer 204. For example, the adapter layer 210 can convert specific commands, data structures, and events into more general commands, data structures, and events. The conversion can ensure that the commands, data structures, and events can be interpreted on any and all of a broader range of hardware platforms.

In some implementations, the adapter layer 210 can convert requests for status information. For example, the adapter layer 210 may convert a request for a current presentation timestamp from a current runtime format to a particular hardware platform format. In some implementations, the adapter layer 210 can convert control operations from the current runtime format into corresponding control or (sequences of control) operations in a specific hardware platform format. As another example, the adapter layer may convert current presentation timestamp information received from a particular hardware platform into a runtime format.

As shown in FIG. 2, the adapter layer 210 here includes an adapter 212, a threaded player module 214, and a data manipulation player module 216. The adapter 212 may be implemented in the form of a video decoder adapter designed to control multithreading of received data and conversion of audio and video elementary stream data into ISO-compliant streams. The adapter layer 210 can perform, directly or indirectly, some or all of the following tasks: (i) receive a single stream of data from a runtime engine (e.g., runtime 208), (ii) identify a first data type (e.g., audio) and a second data type (e.g., video), and (iii) determine whether the hardware decoder is capable of decoding the first and second data types.

The adapter layer 210 may include a video first-in-first-out (FIFO) queue and an audio FIFO queue. Upon receiving a packet of data form the runtime layer 204, the adapter 212 can forward the received packet to an applicable FIFO queue of the video and audio FIFO queues. The adapter 212 can then return control back to the runtime layer 204 after forwarding the packet. If the hardware decoder requests additional data, the adapter 212 can request at least one of the video and audio FIFO queues to feed the additional data to the hardware decoder.

The adapter layer 210 can, for example, determine whether a particular hardware decoder is requesting additional data. For example, adapter 212 can ask platform layer 218 whether a hardware decoder is available. If the adapter layer 210 determines that additional data is requested, the adapter layer 210 can determine that an applicable FIFO queue for storing the additional data is empty. If the applicable FIFO queue is empty, the adapter layer 210 can determine that the runtime engine (e.g., runtime 208) is offering the additional data. The adapter layer 210 can then forward the additional data from the runtime engine to the hardware decoder without placing the second additional data in the applicable FIFO queue.

In the described implementation, the threaded player 214 is only created if the hardware decoder is available. The threaded player module 214 here (i) receives a single stream from the adapter 212, and (ii) generates a first type data stream (e.g., audio) and a second type data stream (e.g., video) from the single stream (e.g., audiovisual data). In effect, the threaded player module 214 converts a single-threaded data stream into a multi-threaded data stream (e.g., two independent data-feeding threads). The multi-threaded data stream typically includes an audio thread and a video thread.

The audio and video streams generated by the threaded player module 214 can contain application-specific characteristics that may not be compatible with downstream components, such as a particular hardware decoder, for example. One or more player modules can therefore be implemented to convert the audio and/or video stream accordingly.

The threaded player module 214 can forward data and control instructions via a chain of player module objects, for example. For example, player module objects can be configured to play a number of data combinations including, but not limited to H264/AAC, H263 (Sorenson)/MP3, H263 (Sorenson)/PCM, VP6 (On2)/MP3, VP6 (On2)/PCM, No video/

(AAC, MP3 or PCM), and (H264, H263, VP6)/No Audio. Typically, each player module object in the chain manipulates or manages data in a slightly different manner. The manipulation may include decompressing, decoding, or other data process. After data is manipulated, the data can be sent as output for presentation on an electronic device. After presenting audiovisual output, the architecture 200 may destroy player module objects. For example, a player module object can be destroyed by calling a destroy function in the architecture 200.

Referring again to FIG. 2, the data manipulation player module 216 may include application programming interfaces (APIs) that are implemented to monitor, manipulate, and feed audio, video, control sequences, or other output into one or more player modules. For example, the data manipulation player module 216 can monitor and manipulate data to ensure proprietary data formats are changed to an industry standard format before transmitting data to a particular hardware platform. In particular, the data manipulation module 216 can perform, directly or indirectly, some of the following tasks: (i) asynchronously receive a first and second type data streams from the threaded player module 214, (ii) generate converted data streams from the first and second type data streams by changing the format to the standard-compliant format, and (iii) forward converted data streams to a hardware decoder.

The adapter layer 210 can use the data manipulation player module 216 to manipulate data by re-packaging the data into an industry standard format which all hardware platforms can understand. The re-packaging may be dependent on the specific audio and video codecs used by the stream. As such, a re-packaging algorithm may be determined during runtime. The data manipulation player module 216 can, for example, allow the determination of how raw data is manipulated. The manipulation can be performed at runtime and thus, appropriate player module architecture is quickly generated and the process of manipulations can begin. The data manipulation player module 216 also ensures that proprietary data formats can be changed to industry-standard formats before data is sent to an industry-standard conforming hardware platform.

In some implementations, the adapter layer 210 may include specific player modules to perform tasks. For example, the adapter layer 210 may include an H264 player module (not shown) which can convert an application-specific data format of an elementary audio stream and an elementary video stream, such as the data format of a Flash® audio/video stream, into H264 ISO-compliant streams (e.g., ISO 14496-15, ISO 14496-10, ISO 14496-3, etc.). In another implementation, the adapter layer 210 may include an On2Sorenson player module (not shown). The On2Sorenson player module can convert the application-specific data format, or a format from a preceding payer module, into raw data streams. In some implementations, the adapter layer 210 may include both an H264 player module and an On2Sorenson player module. Both the H264 player module and the On2Sorenson player module can forward data to a platform layer 218, for example.

The architecture 200 includes a platform layer 218. The platform layer 218 may retrieve compressed audio and video data, decode the data, and present the decompressed audio and video data to a connected electronic device, such as a television, an audio/video receiver, a computer, or other electronic device. The platform layer 218 includes a platform player module 220. The platform player module 220 can ensure that the decompressed data is sent with audio and video data synchronized together. The platform player module 220 can, for example, inform higher software layers about runtime events as they occur. In particular, the platform player module 220 can inform other software layers about when the last frame has been displayed, when more data is required for decoding, or when data should be held back and queued to await decoding. In some implementations, the module 220 can send data to one or more hardware platforms in an asynchronous manner. For example, the module 220 can buffer data such that the data can be sent as requested by another layer in architecture 200.

In some implementations, the application layer 202, the runtime layer 204, and the adapter layer 210 can continue executing operations if, at some point, a platform player module is modified. Namely, the same application 206, runtime 208, and adapter 212 can execute without source code modifications if, for example, the platform player module 220 is changed from "Platform A" to "Platform B." In this example, the "Platform B" implementation may be different than the "Platform A."

In some implementations, the runtime layer 204 and the adapter layer 210 may be modified while the platform layer 218 and the application layer 202 remain unchanged and functional. For example, if the runtime layer 204 were changed from an older version of an application to a newer version of the application, then the same application code may be executed by the new application version, and a new adapter layer can convert data, commands, and events between the new application and the existing platform layer In some implementations, the application 206 may be modified without modifying other system components. In particular, one application 206 can be exchanged with another application. In this example, the runtime layer 204, the adapter layer 210, and the platform layer 218 remain unchanged and fully functional.

In some implementations, the application layer 202, the runtime layer 204, and the adapter layer 210 may be modified, while the existing platform layer 218 remains unchanged and functional. For example, an application can be executed in a first application runtime, and a new adapter may convert the data, commands, and events between the first application runtime and the existing platform layer 218.

Decoded video can be presented in various ways. The runtime layer 204 can render pixels, in one example Flash® UI pixels, into a frame buffer and the platform layer 218 mixes the pixels with decoded video pixels before sending a full image to a hardware display device. In this example, the runtime layer 204 may render a rectangular area in the frame buffer that corresponds to a size and position of the video as specified by the application layer 202, and may be rendered with "transparent" pixels. The runtime layer 204 may also pass the size and position information to the platform layer 218 (e.g., via the adapter 212) so that the platform layer 218 can determine how to position decoded video pixels. In some implementations, when hardware composites decoded video pixels with the frame buffer, the transparent pixels in the frame buffer are mixed with the decoded pixels to display the combined video and rendered pixels.

In another example, the platform layer 218 can return the decoded pixels to the runtime layer 204, which then renders the decoded pixels into a frame buffer. In some implementations, the frame buffer is displayed on a hardware display device. In this example, the runtime layer 204 can manipulate decoded pixels before the pixels can be displayed on a hardware display device. For example, video images can be rotated, skewed, stretched, or blended with other graphics objects in the frame buffer.

Decoded audio can be presented in various ways. In one example, the platform layer 218 can send decoded audio samples to an external audio playback device. In another example, the platform layer 218 can return the decoded audio samples to the runtime layer 204, which mixes the audio with other audio samples. The final mixed audio may be sent to an external audio playback device.

In some implementations, the architecture 200 may present decoded audio and video independently of the runtime on hardware platforms that do not possess the bandwidth to manipulate decoded audio and video. In other implementations, the architecture 200 can present decoded audio and video independently of the runtime layer 204 when, for example, a copy-protected stream does not wish to allow the runtime manipulation of audio and video data.

In some implementations, a non-copy protected stream can be returned to the runtime layer 204 for further manipulation under the control of the application layer 202 when, for example, the hardware platform does not possess the bandwidth to manipulate decoded data.

The adapter layer 210 may receive audio and video stream data and pass the data to the platform layer 218. Some platforms may include a single internal buffer for holding the audio and video data, while other platforms may have one buffer for audio and another for video. Furthermore, the adapter layer 210 can store any amount of data in the platform layer's 218 internal buffers. In some implementations, the adapter layer 210 can ensure that the hardware decoder possesses enough data and/or buffer space to decode the next incoming frame. The size of the buffer can be set by the application layer 202 to compensate for the bandwidth available between the stream source (e.g., a remote server on the internet) and a client decoder. In some implementations, another buffer (e.g., a pre-roll buffer) may be implemented to reduce the likelihood of the decoder starving for data. For example, a pre-roll buffer can prevent video stuttering during playback by ensuring the decoder is not starved for data.

In some implementations, the architecture 200 can compensate for a difference between buffer space requirement and available buffer space. For example, the architecture 200 may implement a first-in-first-out (FIFO) buffer mechanism that can grow and shrink dynamically, as needed. The FIFO buffer mechanism can, for example, be managed by the threaded player module 214.

Turning to the operational flow of architecture 200, the application 206 can inform the runtime 208—here a runtime of the application 206—what the source of a data stream is. The runtime 208 can provide an interface for the application 206 to use for this or other purposes. For example, the runtime 208 may be streaming audio and/or video from an external provider, and the application 206 can use the interface to communicate with the runtime 208 regarding the stream. Here, the application 206 can forward information 222 including, for example: a unified resource identifier (URI) that identifies a stream source, control data, or other information to the runtime 208.

The runtime 208 operates on received data and/or executes received instructions. Operating on received data may include translating data into audio and video output. For example, the runtime 208 can read stream data and determine an audio and video codec type. The runtime 208 can then de-multiplex the audio and video data into data 224 and send the data 224 to the adapter 212 in a single stream. The format of the single stream is typically associated with the application 206, for example a Flash®-proprietary data structure. As another example, the runtime 208 can execute a play or pause control command received from the application 206.

The adapter 212 operates to convert specific commands, data structures, and events into more general commands, data structures, or events. For example, the adapter 212 receives data 224 and forwards the data, here illustrated as data 226, which can be readable to the threaded player module 214. The adapter 212 sends the data 226 (e.g., audio data, video data, and control operation data) to the threaded player module 214.

The threaded player module 214 receives the data 226 (e.g., audio and video data packets) and feeds the data to the platform player module 220 via the data manipulation player module 216. Particularly, the threaded player module 214 determines whether each of the packets includes audio or video data, and converts a single threaded stream into a multithreaded stream. For example, the threaded player module 214 generates separate streams of audio data 228, video data 230, and control operation data 232 from the received single stream of data 226. The separate streams 228-232 are then sent to the data manipulation player module 216.

The threaded player module 214 can employ the data manipulation player module 216 to perform further data operations. For example, the data streams 228, 230, and 232 may be sent to the data manipulation player module 216 where the format of the streams can be modified to a standard-compliant format according to a standard with which at least one hardware decoder in a particular electronic device complies. In another example, the data manipulation player module 216 can receive audiovisual data from the threaded player module 214 via runtime 208 (e.g., data wrapped in a Flash® proprietary data structure) and convert the data to an ISO-compliant stream that any ISO-compliant platform decoder can decode. In some implementations, the data manipulation player module 216 can compress audio and/or video data. The data manipulation player module 216 modifies, compresses, and sends ISO-compliant audio data 234, video data 236, and control data 238 to the platform player module 220.

The platform player module 220 receives the data 234-238 and decodes the data. For example, the platform player module 220 can determine if a hardware decoder is available to decode incoming modified data streams. If a decoder is available, the module 220 can asynchronously send the data 234-238 to the decoder. The hardware decoder can generate one or more decoded data streams from the modified data streams and generate audiovisual output for an electronic device. The platform player module 220 can receive the audiovisual output and present the synchronized output in the electronic device. For example, the platform player module 220 presents decoded audio and decoded video data in a connected electronic device, such as television 108.

In some implementations, the architecture 200 can determine whether the hardware decoder is capable of decoding particular audio and video data types. For example, the architecture 200 can determine the type and format of the audio and video data. In some implementations, the architecture 200 uses packet header information to distinguish between audio information packets and video information packets. In a specific example, the architecture 200 can use metadata to determine whether a particular decoder on an electronic device can present a requested audio and video combination on an electronic device. If a particular platform cannot play the requested audio and video combination together (either because it does not know how to decode one or both of the requested codecs, or it cannot decode them both simultaneously), then the platform layer 218 can return a NULL value indicating that a request cannot be fulfilled. The architecture 200 can convert the codec into an industry standard format. For example, the architecture 200 can remove headers from the audio and video information packets and reformat the data to change the format to the standard-compliant format. In the event that a second stream is requested, but the platform can only decode one stream at a time, the platform layer 218 can return a NULL value to the runtime layer, here the runtime 208.

In some implementations, after determining that the hardware decoder is incapable of decoding the audio and video data types, the architecture 200 can forward other modified data streams based on data having the particular audio and video data types to a software decoder in the electronic device. Using the modified data, the software decoder can generate at least another decoded data stream from other modified data streams. The software decoder can generate another audiovisual output on a particular electronic device from the other decoded data stream.

In some implementations, any number of buffers can be employed in the architecture 200. The buffers can provide smooth data handling and data streaming for any particular hardware platform. For example, the threaded player module 214 can buffer data until the platform player module 220 is ready to receive data. If the platform player module 220 is currently busy, the threaded player module 214 can backlog the data stream in internal buffers until receiving a notification to resume transmitting data. In some implementations, communication between the threaded player module 214 may include a handshaking mechanism. The handshaking mechanism enables the platform player module 220 to request more data when its buffers are empty (or low) and hold off data when its buffers are full, for example. Specifically, when the platform player module 220 requests more data, the threaded player module 214 empties its FIFO buffer until the platform player module 220 sends another "buffer full" message. In some examples, if the FIFO buffer is emptied before the platform player module 220 is full, further packets from the runtime 208 can be dispatched straight to the platform player module 220 without traversing the FIFO buffer. If the platform player module 220 sends a "buffer full" message, the threaded player module 214 can store subsequent data packets from the runtime 208 in the FIFO buffer. Hence the FIFO buffer can grow and shrink as required. The size of the FIFO buffer can, for example, be dictated by the size of the platform player module 220 buffers, the rate at which the platform player module 220 uses up buffered data, and the rate that the platform player module 220 passes the data packets to the adapter 212.

In some implementations, the platform player module 220 may employ a single-threaded runtime layer 204 and a platform layer 218 with two independent audio and video buffers. Employing a single-threaded runtime layer 204 can limit the execution of operations. For example, only one operation may be performed at any given time. Each operation may be required to wait until an entire data packet is processed.

In some implementations, the threaded player module 214 can provide two FIFO buffers or other queues, each of which processes one of separate types of data, such as audio data or video data. In this example, the threaded player module 214 employs two threads, namely, one thread for audio data and one thread for video data. In operation, when a single-threaded runtime sends an audio packet or a video packet, the threaded player module 214 sends the packet to the appropriate thread, which copies the data into the corresponding FIFO buffer. The threaded player module 214 returns control back to the runtime layer 204. This may eliminate or reduce blocking of the single-threaded runtime layer 204. When the platform player module 220 requests more audio or video data, a request can be made to the appropriate thread to feed the module 220 from the FIFO buffer. In some implementations, the architecture 200 can perform optimizations to bypass the FIFO. For example, the architecture 200 can eliminate copying to the FIFO buffer if (a) the platform player module 220 is requesting more data, (b) the FIFO buffer is empty, and (c) the runtime is offering more data. Thus, in such a situation the data (e.g., a packet) can be passed to the platform without storing it in, or copying it to, the FIFO.

In some implementations, video scaling and display techniques may be supported in the architecture 200. For example, a player module's video window can be set with a SetVideoRegion( )method. A "rect" parameter in the SetVideoRegion( )method can be set by the application to match the position and size of the ActionScript VideoObject. If the VideoObject is repositioned or resized then the SetVideoRegion( )method can be called again with the new parameters. The VideoObject itself may be rendered by the application as a fully transparent rectangular region. That is, the off-screen frame buffer that the application renders into and the final on-screen frame buffer are of a pixel format that includes an alpha component. The application can also render other objects on top of that rectangular region, such as text, bitmaps, vector graphics, etc., so the rendered object's value is typically preserved so that the image and the video are blended appropriately. In some implementations, trick modes may be supported in the architecture 200. For example, trick modes may include, but are not limited to play at normal speed, stop, pause, and play from new position.

While the above example implementations describe audio and video data types, the architectures 100 and 200 may be applied to any number of different data types and combinations. For example, implementations may provide for one video stream, two audio streams (e.g., for two different languages), and a closed-captioning stream. Other combinations are possible. In general, the runtime layer 204 can be single-threaded or multi-threaded. The runtime layer 204 may "push" data to the platform layer 218 that is "pulling" data. Particularly, the difference between a push rate and a pull rate is bounded only by the available memory in the system via the FIFOs in the threaded player module 214.

Figure 3:
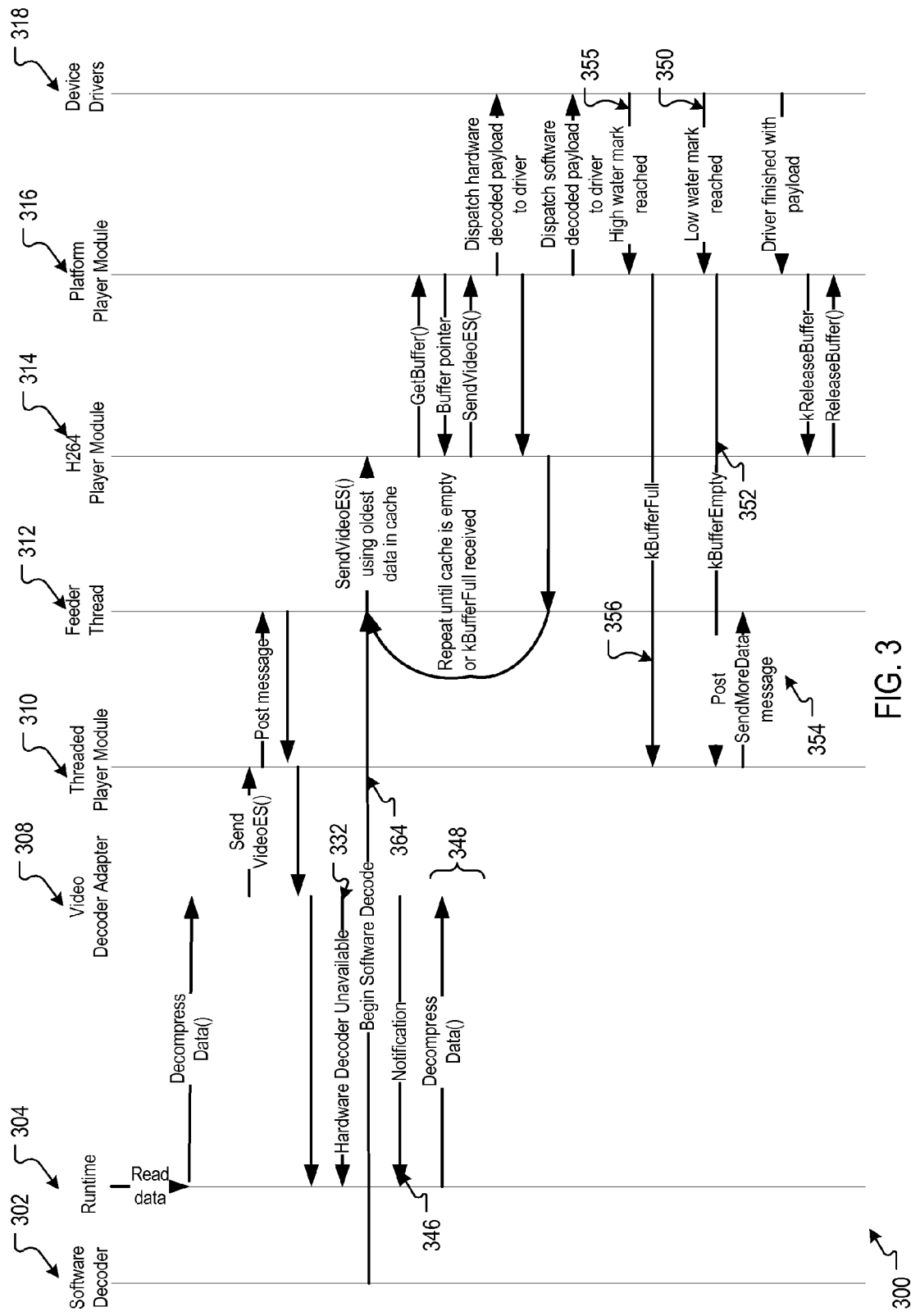
FIG. 3 is a sequential flow diagram of an example method for decoding and generating audiovisual output.

FIG. 3 is a sequential flow diagram of an example method 300 for decoding and generating audiovisual output. The method 300 depicts the relationship between various system modules in the method. As such, FIG. 3 illustrates a high-level example of components that can be used for the adaptation of a media application, such as a Flash® application, in environment 100, for example. The method steps shown may be implemented using computer program code in combination with appropriate hardware. Here, any method steps of FIG. 3 that are not explicitly mentioned may be implemented as described above with reference to FIGS. 1 and/or 2.

FIG. 3 depicts eight sequential lanes including a software decoder 302, a runtime 304, a video decoder adapter 308, a threaded player module 310, a feeder thread 312, an H264 player module 314, a platform player module 316, and device drivers 318.

In step 332, the method 300 determines whether a hardware decoder is available to decode a particular modified data stream. For example, the method 300 can determine whether a buffer-low event notification or a buffer-empty event notification have been received in the hardware decoder. If either a buffer-low event notification or a buffer-empty event notification has been received, the hardware decoder can be considered available. Similarly, the method 300 can determine if a buffer-full event notification has been received in the hardware decoder. If a buffer-full event notification has been received, the hardware decoder may not be available and the system may delay the asynchronous forwarding of data streams until a buffer-low event notification or a buffer-empty event notification is received. If the determination is made that the hardware decoder is not available to decode a particular modified data stream, the method 300 can forward a notification to the runtime 304 to reduce the synchronous forwarding of data and the runtime 304 can respond by reducing the forwarding of the data.

The method 300 may also implement a buffering system to handle buffer levels. For example, the platform player module 316 can determine that a system buffer is empty, low, or full. The process 300 can send notification messages to this effect. The notification messages may increase or decrease the speed of sending data. For example, if a particular player module determines that a buffer-low event or a buffer-empty event occurred in the hardware decoder, a buffer-low notification or a buffer-empty notification can be generated at the device drivers 318 and sent to the player module (e.g., platform player module 316). The buffer-low event notification may invoke the platform player module 316 to send a kBufferEmpty event, in step 352. The threaded player module 310 may then post a "send data" message to the feeder thread 312, in step 354.

In another example, if a particular player module determines that a buffer-full event occurred in the hardware decoder, a buffer-full notification event can be generated at the device drivers 318 and sent to the player module (e.g., platform player module 316), in step 355. The buffer-full event notification may invoke the platform player module 316 to send a kBufferFull event, in step 356.

In one example, the method 300 can call a SetPrerollSize( )method to indicate how large a pre-roll buffer should be. The pre-roll size is represented by the total number of bytes to be cached by the player modules before the first audio and/or video frame is presented. The pre-roll size is used together with the buffer sizes set in the SetBufferLevels( )method, which may indicate the desired high and low water marks for the audio and video cached data. These values may be cues that the player modules can use to ignore the high and low values without any side affects other than the potential to starve or overflow internal buffers. In effect, the runtime 304 may continue to read and send data to the player modules for as long as the runtime 304 suspects the player modules require data. The player modules may signal that internal buffers are full by sending the kBufferFull event, and can also signal that the modules require more data by sending the kBufferLow or kBufferEmpty events.

In general, the runtime 304 can forward data at a predefined rate. If the rate is too slow or too fast for one or more downstream components, errors may occur. The video decoder adapter 308 can detect if errors occur during data transmissions. For example, the video decoder adapter 308 can detect if data is sent too quickly which may cause data packets to be dropped. Similarly, the video decoder adapter 308 can detect if data is sent too slowly causing starvation in the underlying hardware (e.g., causing audio blips and/or missing video content). In the event that the data is sent too slowly or quickly, the video decoder adapter 308 can forward a notification 346 to the runtime 304 to increase or reduce the synchronous forwarding of the data, accordingly. The runtime 304 can then increase/reduce the synchronous forwarding of the data in response to receiving the notification. In some implementations, the notification to reduce the synchronous forwarding can include that the video decoder adapter does not accept data received from the application. Such a notification then causes the application to re-forward the data portion in step 348.

In the event that the video decoder adapter 308 determines that the hardware decoder is not available, the decoding and presentation can be performed by the software decoder 302.

For example, in step 364, the software decoder 302 can instruct the feeder thread 312 to begin decoding the buffer contents using software components. The software decoder 302 can perform the decoding to generate at least one decoded data stream from a received data stream and provide the decoded data to the device drivers 318. The output can be presented on an output device (e.g., electronic device).

When the hardware decoding mechanism is used, the method 300 decodes incoming data and sends the data directly to the electronic device (e.g., television) without consulting or employing application resources again. Thus, in such implementations/situations the runtime 304 is unaware of the decoding and presentation activities occurring on the hardware and/or electronic device.

In some implementations, during the decoding and presentation of audiovisual output, events can occur. These events occur asynchronously to the application and other operations. As such, a notification mechanism can be used to send event instances from the player modules to clients. Events can be sent to notifier objects that are added to the player modules through an AddNotifier( )method. The player module implementation tracks all notifier objects that are added (and removed) and sends the event to each registered notifier that has expressed an interest the event type.

In some implementations, each event that is sent includes the time the event occurred (e.g., m_timestampOfEvent), the player module's state (e.g., m_state), the event type (e.g., m_eventType), and the streamer type (e.g., m_streamerType) that generated the event. Example events include kBufferFull, kBufferLow, kBufferEmpty, kPre-rolling, kVDimAvailable, kReachedEOS, kFrameUpdate, kError, kReleaseBuffer, and kStateChanged. The kBufferFull event is typically sent to tell the runtime 304 to stop sending data. The kBufferLow and kBufferEmpty events indicate that the player module can continue accepting data from the runtime 304. Data will be sent until either there is no more data in the stream or a kBufferFull event is sent. The kReleaseBuffer event is used to release the buffer that was sent to SendAudioES( ) or SendVideoES( ). If kReleaseBuffer events are not sent, then the buffer may be leaked. This event must be sent even if the player module has no intention of using the data. The kStateChanged event is sent to indicate that the player module's state has changed. The kVDimAvailable event is sent to indicate the decoded video dimensions. The kReachedEOS event is sent when the last sample has been decoded and presented. The kError event is sent to indicate an error in the stream. The kFrameUpdate event is sent when a new video frame is displayed. The kPre-rolling event is sent while pre-rolling, before decoding and displaying of the stream has started, to show the buffer levels growing before the decoding starts.

Figure 4:
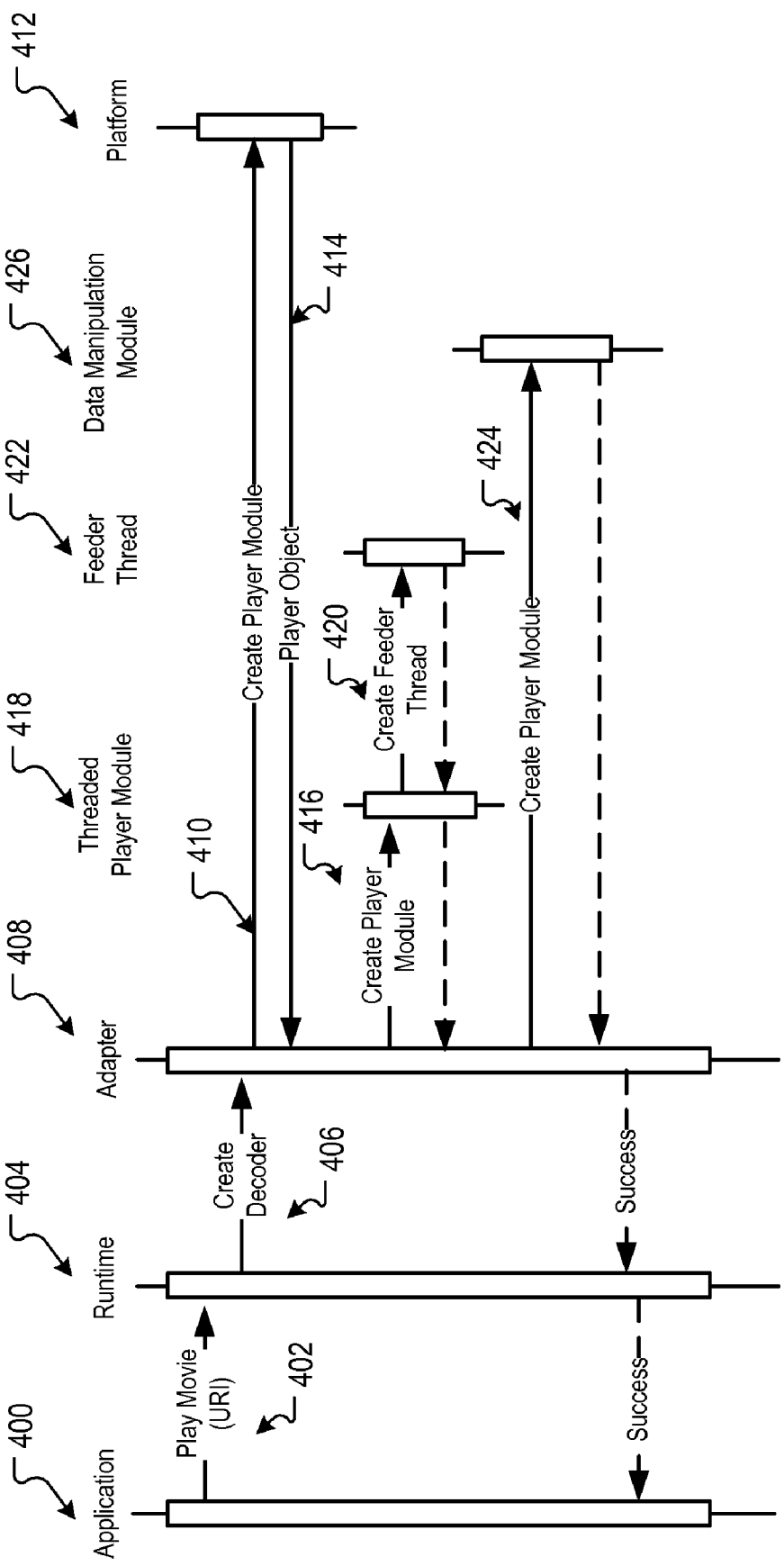
FIG. 4 is another sequential flow diagram showing an example of determining hardware availability and establishing a data path from runtime to platform.

FIG. 4 is another sequential flow diagram showing an example of determining hardware availability and establishing a data path from runtime to platform. Here an application 400 is initiated and generates a Play Movie event 402. For example, the URI of a streaming data source can be specified. A runtime 404 can be initiated upon the event 402 and can in turn send a Create Decoder event 406 to initiate an adapter 408. The Create Decoder event 406 can specify the audio and/or video type of the data. The adapter 408, when initiated, sends a Create StreamPlayer event 410 to a platform 412. The Create StreamPlayer event 410 can specify the audio and/or video type of the data. If the platform 412 determines that it can decode the stream of the given audio and video type, it returns a valid player object 414 to the adapter 408.

On a successful creation of the player object 414, the adapter 408 here sends a Create StreamPlayer event 416 to initiate a threaded player module 418. The threaded player module 418, in turn, sends a Create Feeder Thread event 420 to initiate a feeder thread 422. Control can then be returned from the feeder thread 422 via the threaded player module 418 to the adapter 408.

Next, the adapter 408 can send a Create StreamPlayer event 424 to initiate a data manipulation module 426, after which control can be returned to the adapter 408. Following the initiation of the data manipulation module 426, the platform player can be connected to the data manipulation module 426, and the data manipulation module 426 can be connected to the threaded player module 418.

Finally, control can be returned from the adapter 408 to the application 400.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a blu-ray player, a television, a set-top box, or other digital devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, an infrared (IR) remote, a radio frequency (RF) remote, or other input device by which the user can provide input to the computer. Inputs such as, but not limited to network commands or telnet commands can be received. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, in an electronic device, a single stream that is synchronously forwarded from a runtime engine of an application and that comprises at least first and second types of data, the single stream having a format associated with the runtime engine;
   generating a first type data stream and a second type data stream from the single stream;
   generating converted data streams from the first and second type data streams by changing the format to a standard-compliant format according to a standard with which at least one hardware decoder in the electronic device complies;
   determining that the hardware decoder is available to decode the converted data streams, wherein the determination is based at least in part on one or more notifications of asynchronous hardware decoder events;
   upon the determination, asynchronously forwarding the converted data streams to the hardware decoder;
   generating, by the hardware decoder, at least one decoded data stream from the modified data streams; and
   generating an output from the decoded data stream.

2. The method of claim 1, wherein each of the first and second types of data includes at least one data type selected from: video, audio, image, text, and closed-captioning information.

3. The method of claim 1, wherein the first and second data types include audio and video data types, respectively, the method further comprising:
   identifying the audio and video data types; and
   determining whether the hardware decoder is capable of decoding the audio and video data types.

4. The method of claim 3, wherein for particular audio and video data types the determination is made that the hardware decoder is not capable of decoding at least one of the particular audio and video data types, the method further comprising:
   forwarding other converted data streams based on data having the particular audio and video data types to a software decoder in the electronic device;
   generating, by the software decoder, at least another decoded data stream from the other converted data streams; and
   generating another output from the other decoded data stream.

5. The method of claim 1, wherein determining that the hardware decoder is available comprises:
   receiving a first notification from the hardware decoder indicating at least one of a buffer-low event and a buffer-empty event in the hardware decoder.

6. The method of claim 5, wherein a second notification is received from the hardware decoder before the first notification, the second notification indicating a buffer-full event in the hardware decoder, wherein the method further comprises:
   delaying the forwarding of the converted data streams until the first notification is received.

7. The method of claim 5, wherein the electronic device includes an adapter layer communicating with the runtime engine and with a platform layer that includes the hardware decoder, wherein the adapter layer includes a video first-in-first-out (FIFO) queue and an audio FIFO queue, and wherein upon the adapter layer receiving a packet of the data from the runtime engine, the method further comprises:

forwarding the packet to an applicable FIFO queue of the video and audio FIFO queues;

returning control back to the runtime engine after forwarding the packet; and upon the hardware decoder requesting first additional data, requesting at least one of the video and audio FIFO queues to feed the first additional data to the hardware decoder.

8. The method of claim 7, the method further comprising:

determining that the hardware decoder is requesting second additional data;

determining that an applicable FIFO queue for the second additional data is empty;

determining that the runtime engine is offering the second additional data; and forwarding the second additional data from the runtime engine to the hardware decoder without placing the second additional data in the applicable FIFO queue.

9. The method of claim 1, wherein the format includes that the single stream comprises packets each having a header, wherein the runtime engine distinguishes between audio information packets and video information packets using the headers, and wherein generating the converted data streams comprises:

removing the headers from the audio information packets and the video information packets; and reformatting the data, after removing the headers, to change the format to the standard-compliant format.

10. The method of claim 1, wherein for a particular converted data stream the determination is made that the hardware decoder is not available to decode the particular modified data stream, the method further comprising:

forwarding a notification to the runtime engine to reduce the synchronous forwarding of the data, wherein the runtime engine reduces the synchronous forwarding of the data in response to the notification.

11. The method of claim 10, wherein the runtime engine forwards data at a predefined rate, and wherein the notification to reduce the synchronous forwarding causes the runtime engine to re-forward a data portion that the runtime engine forwarded before the notification.

12. A computer program product tangibly embodied in a non-transitory computer storage medium and comprising instructions that when executed by a processor perform a method comprising:

receiving, in an electronic device, a single stream that is synchronously forwarded from a runtime engine of an application and that comprises at least first and second types of data, the single stream having a format associated with the runtime engine;

generating a first type data stream and a second type data stream from the single stream;

generating converted data streams from the first and second type data streams by changing the format to a standard-compliant format according to a standard with which at least one hardware decoder in the electronic device complies;

determining that the hardware decoder is available to decode the converted data streams, wherein the determination is based at least in part on one or more notifications of asynchronous hardware decoder events;

upon the determination, asynchronously forwarding the converted data streams to the hardware decoder;

generating, by the hardware decoder, at least one decoded data stream from the modified data streams; and generating an output from the decoded data stream.

13. An electronic device comprising:

a processor;

a hardware decoder configured to generate decoded data compliant with a standard-compliant format according to a standard, and forward the decoded data for output; and a computer readable storage medium including instructions that when executed by the processor generate:

(A) a runtime engine of an application, the runtime engine synchronously forwarding a single stream that comprises at least first and second types of data, the single stream having a format associated with the runtime engine;

(B) a first player module that (B1) receives the single stream, (B2) determines that the hardware decoder is available, based at least in part on one or more notifications of asynchronous hardware decoder events, and (B3) generates a first type data stream and a second type data stream from the single stream; and (C) a second player module that (C1) receives the first and second type data streams from the first player module, (C2) generates converted data streams from the first and second type data streams by changing the format to the standard-compliant format, and (C3) asynchronously forwards the converted data streams to the hardware decoder.

14. The electronic device of claim 13, wherein the instructions when executed by the processor further generate:

(D) an adapter that (D1) receives the single stream from the runtime engine and forwards the single stream to the first player module, (D2) identifies the first and second types of data, and (D3) determines whether the hardware decoder is capable of decoding the first and second types of data.

15. The electronic device of claim 14, wherein for particular audio and video data types the adapter determines that the hardware decoder is not capable of decoding at least one of the particular audio and video data types, and wherein the instructions when executed by the processor further generate:

(E) a software decoder;

wherein the adapter further (D4) forwards other modified data streams based on data having the particular audio and video data types to the software decoder;

wherein the software decoder (E1) generates at least another decoded data stream from the other modified data streams; and wherein another output is generated from the other decoded data stream.

16. The electronic device of claim 14, wherein the adapter is included in an adapter layer that includes a video first-in-first-out (FIFO) queue and an audio FIFO queue, and wherein upon the adapter layer receiving a packet of the data from the runtime engine, the adapter (D4) forwards the packet to an applicable FIFO queue of the video and audio FIFO queues, (D5) returns control back to the runtime engine after forwarding the packet, and, upon the hardware decoder requesting first additional data, (D6) requests at least one of the video and audio FIFO queues to feed the first additional data to the hardware decoder.

17. The electronic device of claim 16, wherein the adapter further (D7) determines that the hardware decoder is requesting second additional data, (D8) determines that an applicable FIFO queue for the second additional data is empty, (D9) determines that the runtime engine is offering the second additional data, (D10) forwards the second additional data from the runtime engine to the hardware decoder without placing the second additional data in the applicable FIFO queue.

18. The electronic device of claim 14, wherein the hardware decoder includes at least one buffer for the converted data streams, wherein the hardware decoder further generates a first notification to the first player module indicating at least one of a buffer-low event and a buffer-empty event in the hardware decoder, and wherein the first player module performs the determination that the hardware decoder is available based on the first notification.

19. The electronic device of claim 18, wherein the hardware decoder further generates a second notification to the first player module from the buffer before the first notification, the second notification indicating a buffer-full event in the hardware decoder, and wherein the first player module delays the forwarding of the converted data streams until the first notification is received.

* * * * *